US012754938B2

(12) United States Patent
Mass et al.

(10) Patent No.: US 12,754,938 B2
(45) Date of Patent: Oct. 6, 2026

(54) RANKING-AUGMENTED GENERATION FOR LONG DOCUMENTS

(71) Applicant: International Business Machines Corporation, Armonk, NY (US)

(72) Inventors: Yosi Mass, Ramat Gan (IL); Assaf Toledo, Ramat Gan (IL); Asaf Yehudai, Jerusalem (IL); Boaz Carmeli, Koranit (IL); Danish Contractor, Somerset, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 18/652,839

(22) Filed: May 2, 2024

(65) Prior Publication Data

US 2025/0342181 A1 Nov. 6, 2025

(51) Int. Cl.
*G06F 40/00* (2020.01)
*G06F 16/3329* (2025.01)
*G06F 16/3332* (2025.01)

(52) U.S. Cl.
CPC ...... *G06F 16/3329* (2019.01); *G06F 16/3334* (2019.01)

(58) Field of Classification Search
CPC .......................... G06F 16/3329; G06F 16/3334
See application file for complete search history.

(56) References Cited

U.S. PATENT DOCUMENTS 7,797,323 B1 * 9/2010 Eshghi ................ G06F 16/1748 707/747
11,074,412 B1 * 7/2021 Leeman-Munk ..... G06F 40/284
11,972,223 B1 * 4/2024 DeFoor ................. G06F 40/289
12,061,970 B1 * 8/2024 Lo ............................ G06N 3/10
12,293,758 B1 * 5/2025 Papangelis .......... G10L 15/1815
2010/0082615 A1 * 4/2010 Clinchant ............... G06F 16/58 707/E17.046

(Continued)

FOREIGN PATENT DOCUMENTS

JP 2023053867 A 4/2023

OTHER PUBLICATIONS

K. Eshghi et al., "A Framework for Analyzing and Improving Content-Based Chunking Algorithms," pp. 1-10 (2005). (Year: 2005).*

(Continued)

*Primary Examiner* — Fariba Sirjani
(74) *Attorney, Agent, or Firm* — Yee & Associates, P.C.

(57) ABSTRACT

A computer-implemented method comprising: receiving, as input, a query and a source document intended for a content-grounded question-answering or multi-turn conversation task by a specified large language model (LLM) which has a context window size limit, wherein the source document has a size which exceeds the context window size limit; dividing the source document into a plurality of segments; applying a language model to each of the segments, to assign to each of the segments a relevance score; selecting the k-top segments having the highest the relevance scores; combining the selected k-top segments into a virtual document having a size which complies with the context window size limit; and feeding the virtual document as input to the specified LLM, to generate a response that is grounded in the content of the virtual document.

20 Claims, 3 Drawing Sheets

(56) References Cited

U.S. PATENT DOCUMENTS

| | | | | |
|---|---|---|---|---|
| 2019/0163692 | A1* | 5/2019 | Duan | G06F 16/3329 |
| 2020/0026760 | A1* | 1/2020 | Chiu | G06N 3/084 |
| 2020/0327197 | A1* | 10/2020 | Bhowal | G06N 5/041 |
| 2021/0375280 | A1* | 12/2021 | Wang | G10L 15/063 |
| 2023/0111978 | A1* | 4/2023 | Veit | G06F 16/334 706/25 |
| 2023/0153352 | A1* | 5/2023 | Mondal | G06V 10/764 707/736 |
| 2024/0296279 | A1* | 9/2024 | Gardner | G06F 16/3329 |
| 2024/0394942 | A1* | 11/2024 | Shankhdhar | G06V 30/418 |
| 2025/0086735 | A1* | 3/2025 | Vedula | G06Q 50/18 |
| 2025/0110973 | A1* | 4/2025 | Yan | G06F 16/3347 |
| 2025/0200290 | A1* | 6/2025 | Birru | G06F 16/33 |
| 2025/0232139 | A1* | 7/2025 | Aberle | G06F 40/40 |
| 2025/0278564 | A1* | 9/2025 | Yuan | G06F 40/284 |
| 2025/0291768 | A1* | 9/2025 | Vinodkumar | G06F 16/1734 |
| 2025/0292016 | A1* | 9/2025 | Malkemus | G06F 40/20 |
| 2025/0321995 | A1* | 10/2025 | Jain | G06F 40/30 |
| 2025/0328523 | A1* | 10/2025 | Zhang | G06F 16/90332 |
| 2025/0335445 | A1* | 10/2025 | Ko | G06F 16/24553 |
| 2025/0335492 | A1* | 10/2025 | Vouitsis | G06F 16/338 |
| 2025/0342181 | A1* | 11/2025 | Mass | G06F 16/3334 |
| 2026/0037523 | A1* | 2/2026 | Jain | G06F 16/24578 |

OTHER PUBLICATIONS

Albert Gu et al, "Efficiently Modeling Long Sequences with Structured State Spaces"; Online at: https://arxiv.org/abs/2111.00396, Aug. 5, 2022.

Albert Gu et al, "Mamba: Linear-Time Sequence Modeling with Selective State Spaces"; Online at: https://arxiv.org/abs/2312.00752, Dec. 1, 2023.

Asaf Yehudai et al, "GENIE: Achieving Human Parity in Content-Grounded Datasets Generation"; Online at: https://arxiv.org/abs/2401.14367, Jan. 25, 2024.

Bing Wang et al, "Unleashing Infinite-Length Input Capacity for Large-scale Language Models with Self-Controlled Memory System"; Online at: https://arxiv.org/abs/2304.13343, Apr. 26, 2023.

Bo Peng et al, "RWKV: Reinventing RNNs for the Transformer Era"; Online at: https://arxiv.org/abs/2305.13048, Dec. 11, 2023.

Bryan Wang et al, "Enabling Conversational Interaction with Mobile UL using Large Language Models"; CHI '23: Proceedings of the 2023 CHI Conference on Human Factors in Computing Systems; Article No. 432, pp. 1-17, Apr. 19, 2023.

Guanghui Qin et al, "The NLP Task Effectiveness of Long-Range Transformers"; Online at: https://arxiv.org/abs/2202.07856, Feb. 11, 2023.

Iz Beltagy et al, "Longformer: The Long-Document Transformer"; Online at: https://arxiv.org/abs/2004.05150, Dec. 2, 2020.

Manzil Zaheer et al, "Big Bird: Transformers for Longer Sequences"; Online at: https://arxiv.org/abs/2007.14062, Jan. 8, 2021.

Michael Poli et al, "Hyena Hierarchy: Towards Larger Convolutional Language Models"; Online at: https://arxiv.org/abs/2302.10866, Apr. 19, 2023.

Nelson F. Liu et al, "Lost in the Middle: How Language Models Use Long Contexts"; Online at: https://arxiv.org/abs/2307.03172, Nov. 20, 2023.

Nir Ratner et al, "Parallel Context Windows for Large Language Models"; Online at: https://arxiv.org/abs/2212.10947, Aug. 1, 2023.

Ofir Press et al, "Train Short, Test Long: Attention with Linear Biases Enables Input Length Extrapolation"; Online at: https://arxiv.org/abs/2108.12409, Apr. 22, 2022.

Reiichiro Nakano et al, "WebGPT: Browser-assisted question-answering with human feedback"; Online at: https://arxiv.org/abs/2112.09332, Jun. 1, 2022.

Shouyuan Chen et al, "Extending Context Window of Large Language Models Via Position Interpolation"; Online at: https://arxiv.org/abs/2306.15595, Jun. 28, 2023.

Suvodip Dey et al "Towards Generalized and Explainable Long-Range Context Representation for Dialogue Systems"; Online at: https://arxiv.org/abs/2210.06282, Dec. 15, 2022.

Tom Kwiatkowski et al, "Natural Questions: A Benchmark for Question Answering Research"; Transactions of the Association for Computational Linguistics, 7:452-466, 2019.

Vaibhav Adlakha et al, "Evaluating Correctness and Faithfulness of Instruction-Following Models for Question Answering"; Online at: https://arxiv.org/abs/2307.16877, Jul. 31, 2023.

Yusen Zhang et al, "SUMMN: A Multi-Stage Summarization Framework for Long Input Dialogues and Documents"; In Proceedings of the 60th Annual Meeting of the Association for Computational Linguistics (vol. 1: Long Papers), pp. 1592-1604, May 22-27, 2022.

Zhiruo Wang et al, "Learning to Filter Context for Retrieval-Augmented Generation"; Online at: https://arxiv.org/abs/2311.08377, Nov. 14, 2023.

Zihang Dai et al, "Transformer-XL: Attentive Language Models Beyond a Fixed-Length Context"; Online at: https://arxiv.org/abs/1901.02860, Jun. 2, 2019.

Vaswani et al., "Attention is All you Need", arXiv:1706.03762v7 [cs.CL], Aug. 2, 2023, 15 pages.

* cited by examiner

RANKING-AUGMENTED GENERATION FOR LONG DOCUMENTS

BACKGROUND

The invention relates to the field of machine learning and artificial intelligence.

Large language models (LLMs), such as OpenAI's ChatGPT or Anthropic's Claude, have demonstrated exceptional performance on many natural language processing (NLP) tasks, and are capable of answering questions on various topics.

However, many LLMs are limited by the number of tokens that the model can take as input when generating responses. For example, in GPT-3, the context window size is 2 k (2,000), and in GPT-4 it is a larger 32 k. But even a window size of 32 k tokens may not be sufficient when using longer documents.

Larger context window sizes generally increase the ability to perform in-context learning in the prompt inputs. Larger context windows may also provide the LLM with context information that was not available at the time the LLM was trained. Thus, providing more examples as prompt inputs enables the LLM to leverage better understanding of the context of the question, and in turn to generate more relevant responses.

However, the computational costs of larger context windows tend to increase dramatically as the number of tokens is increased. Accordingly, it would be beneficial to allow larger context windows in LLMs, without significantly increasing the computational costs associated therewith.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising: receiving, as input, a query and a source document intended for a content-grounded question-answering or multi-turn conversation task by a specified large language model (LLM) which has a context window size limit, wherein the source document has a size which exceeds the context window size limit; dividing the source document into a plurality of segments; applying a language model to each of the segments, to assign to each of the segments a relevance score; selecting the k-top segments having the highest the relevance scores; combining the selected k-top segments into a virtual document having a size which complies with the context window size limit; and feeding the virtual document as input to the specified LLM, to generate a response that is grounded in the content of the virtual document.

Another embodiment relates to a system comprising at least one hardware processor; and a non-transitory computer-readable storage medium having program code embodied therewith, the program code executable by the at least one hardware processor to: receive, as input, a query and a source document intended for a content-grounded question-answering or multi-turn conversation task by a specified large language model (LLM) which has a context window size limit, wherein the source document has a size which exceeds the context window size limit, divide the source document into a plurality of segments, apply a language model to each of the segments, to assign to each of the segments a relevance score, select the k-top segments having the highest the relevance scores, combine the selected k-top segments into a virtual document having a size which complies with the context window size limit, and feed the virtual document as input to the specified LLM, to generate a response that is grounded in the content of the virtual document.

A further embodiment relates to a computer program product comprising a non-transitory computer-readable storage medium having program code embodied therewith, the program code executable by at least one hardware processor to: receive, as input, a query and a source document intended for a content-grounded question-answering or multi-turn conversation task by a specified large language model (LLM) which has a context window size limit, wherein the source document has a size which exceeds the context window size limit; divide the source document into a plurality of segments; apply a language model to each of the segments, to assign to each of the segments a relevance score; select the k-top segments having the highest the relevance scores; combine the selected k-top segments into a virtual document having a size which complies with the context window size limit; and feed the virtual document as input to the specified LLM, to generate a response that is grounded in the content of the virtual document.

In some embodiments, the steps of receiving, dividing, applying, selecting, combining, and feeding are iterated two or more times, wherein, in each current one of the iterations, the current query comprises queries and responses from at least one previous iteration.

In some embodiments, the dividing is performed using a sliding window operation or using semantic chunking.

In some embodiments, the relevance score for each of the segments is computed by applying the language model to the segment, with a prompt instructing the language model to generate a query based on the segment.

In some embodiments, the relevance score is the cross-entropy loss for each of the generated responses.

In some embodiments, the language model is an encoder-based language model, wherein the loss is computed based, at least in part, on a similarity of the representation of each of the generated responses to the representation of the input query; or wherein the language model is an encoder-decoder or decoder-only language model, and the loss is computed based, at least in part, on the inverse of perplexity of the representation of each of the generated responses to the representation of the input query.

In some embodiments, the task comprises one of: (i) end-to-end inference based on the query and single the source document; (ii) end-to-end training based on the query, a single the source document, and a gold response; or (iii) a plurality of instances of in-context learning, each comprising a query, a source document, and a gold response, and using only a portion of the context window.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied as a computer-implemented method, a system, and a computer program product, which provides for converting a long-form textual input (such as a long-form document) for a large language model (LLM), in conjunction with a question answering or a multi-turn conversation task, into a shorter relevant virtual prompt. In some embodiments, the virtual prompt retains only those portions of the original prompt which are determined to provide the most relevant context to generate the correct output from the LLM.

In some embodiments, the original long-form textual input exceeds the token limit imposed by the context window of the LLM, wherein the virtual prompt is configured to fall within the same token limit.

In some embodiments, the present technique is intended for use in scenarios where a user uploads a document to an LLM, for use in connection with a question answering session, wherein the uploaded document may exceed the token limit imposed by the context window of the LLM.

In some embodiments, the present technique provides for dividing the document into a plurality of segments, and using a language model to rank the plurality of segments by the likelihood to contain answers to the user question. The present technique then generates a virtual document (termed herein "VDOC") from the top-k segments, wherein the VDOC may be used as input to the LLM, to generate an answer.

The present technique is directed to the natural language processing (NLP) task of content-grounded conversation, where answers should come from a given document or passages. As used herein, the term "content-grounded" refers generally to responses generated by a language model based on a prompt and given content (i.e., information). The response may be generated by the model based on a question, given a document that includes information needed for the answer. The task of generating content-grounded responses by language model may be represented as: "Given a question and a document, create an answer that is grounded in the main point of the document, without any additional or superfluous information that is not in the document."

Typical scenarios for content-grounded conversation include customer support bots, where customers converse with a chatbot over a specified knowledge-base, such as company policies or other documentation. In another scenario, a user uploads a document and converses with an AI agent over the content of the uploaded document.

Figure 1:
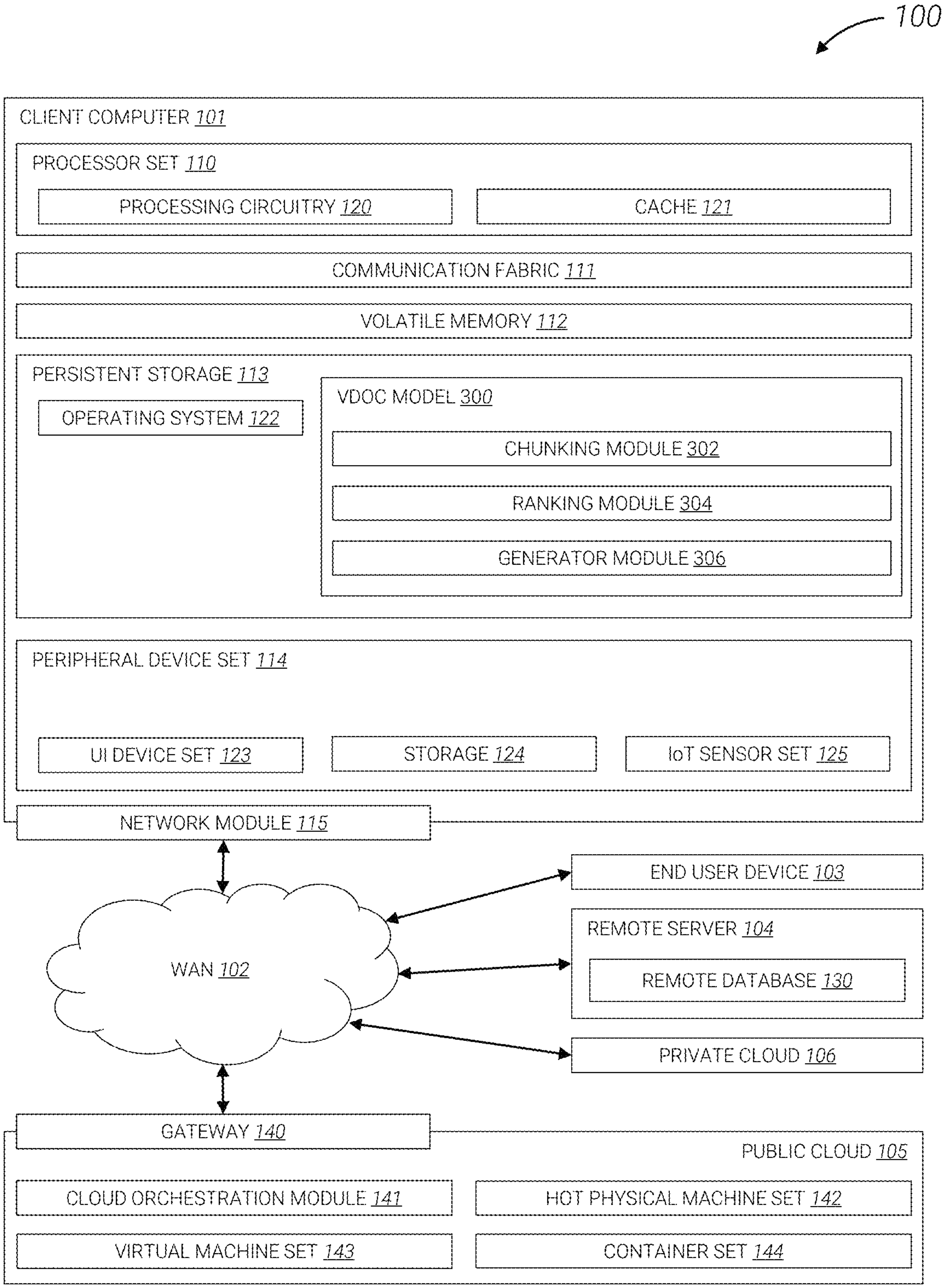
FIG. 1 is a block diagram of an exemplary computing environment, containing an example of an environment for the execution of at least some of the computer code involved in performing the inventive methods, according to an embodiment.

Reference is now made to FIG. 1, which shows a block diagram of an exemplary computing environment 100, containing an example of an environment for the execution of at least some of the computer code involved in performing the inventive methods, such as VDOC model 300, comprising a chunking module 302, a ranking module 304, and/or a generator module 306. In addition to block 300, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 300, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
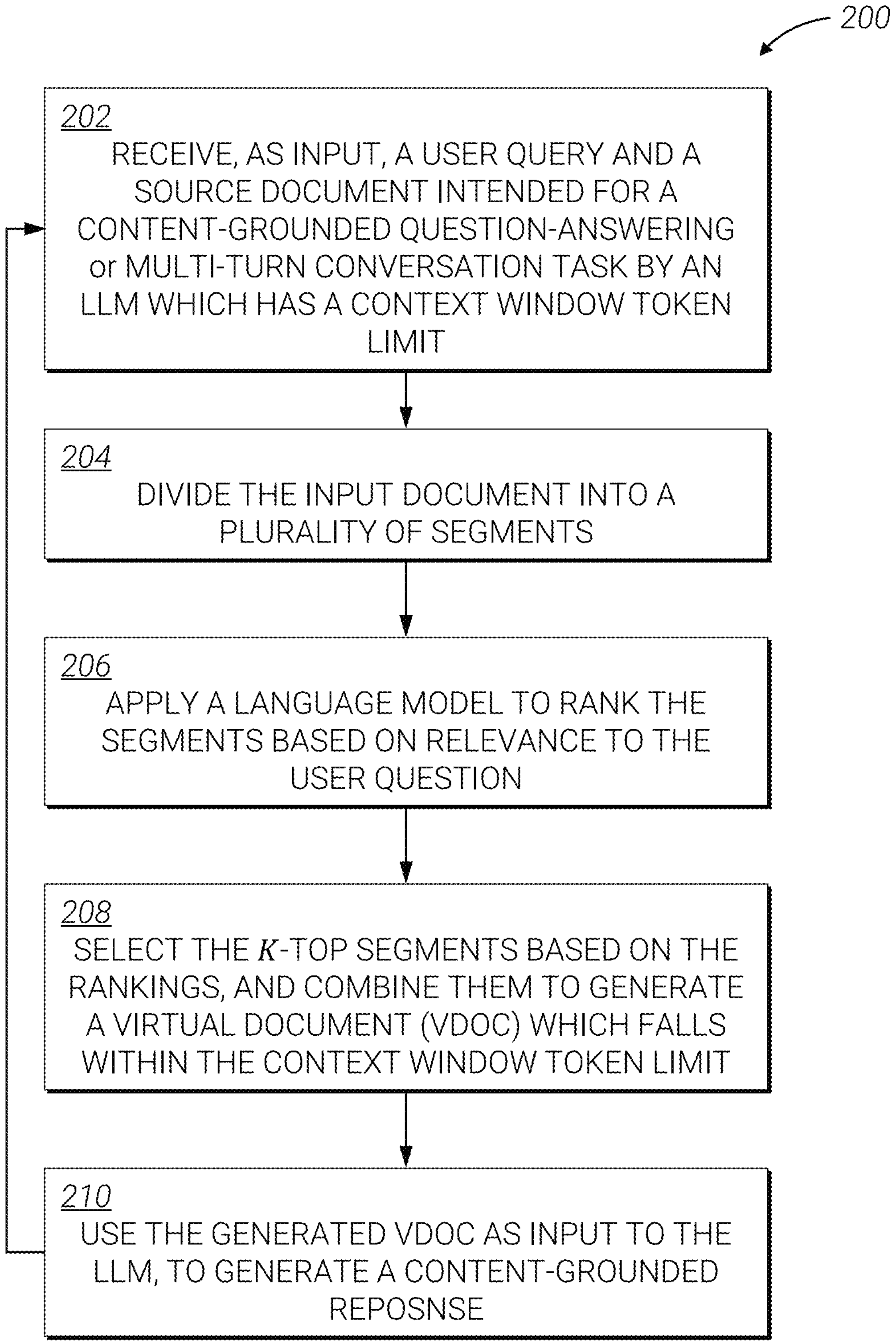
FIG. 2 illustrates a method for converting a long-form textual input (such as a long-form document) for a large language model (LLM), in conjunction with a question answering or a multi-turn conversation task, into a shorter relevant virtual prompt.

The instructions of VDOC model 300 are now discussed with reference to the flowchart of FIG. 2, which illustrates a method 200 for converting a long-form textual input (such as a long-form document) for a large language model (LLM), in conjunction with a question answering or a multi-turn conversation task, into a shorter relevant virtual prompt.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, or by any other applicable component of computing environment 100), unless specifically stated otherwise.

Figure 3:
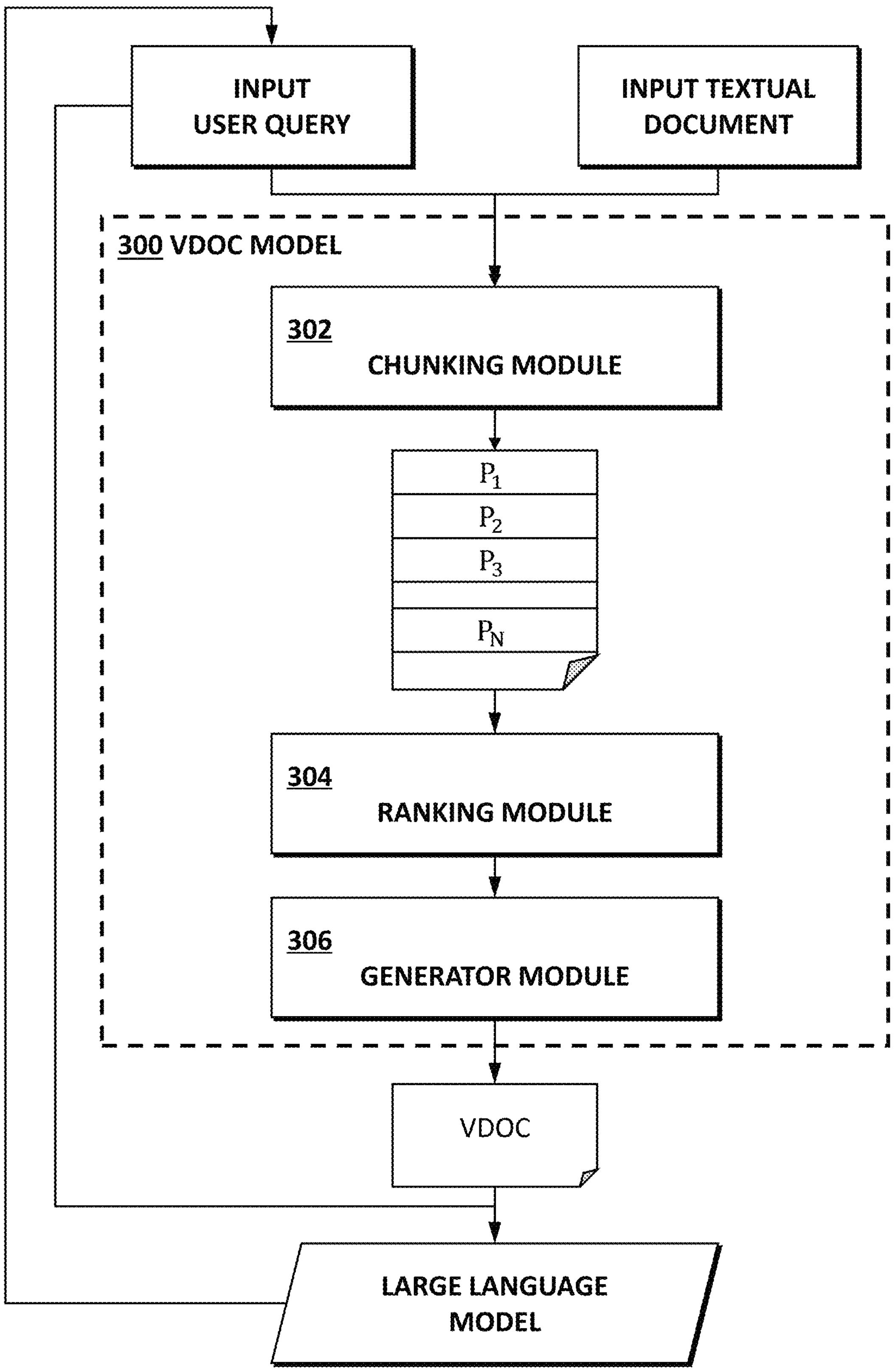
FIG. 3 is a schematic diagram of the process steps in a method of the present disclosure for converting a long-form textual input (such as a long-form document) for a large language model (LLM), in conjunction with a question answering or a multi-turn conversation task, into a shorter relevant virtual prompt.

FIG. 3 is a schematic diagram of the process steps in a method of the present disclosure for converting a long-form textual input (such as a long-form document) for a large language model (LLM), in conjunction with a question answering or a multi-turn conversation task, into a shorter relevant virtual prompt.

Method 200 begins in step 202, wherein VDOC model 300 receives, as input, a user query and a long-from textual input (such as a lengthy document), wherein the user query is associated with a question answering or a multi-turn conversation task for a specified LLM. In some embodiments, the context window of the LLM imposes a token limit which specifies the number of tokens that the model can take as input when generating responses.

In some embodiments, in the case of a multi-turn conversation task, the input query may comprise a concatenation of all or part of the history of the conversation (e.g., all of part of both the user turns and the system answers). For example, in some embodiments, the input query may comprise only a first or last n turns of the conversation, only the first user query and the last n turns (skipping the turns in between), or any other similar strategy. In some embodiments, the input query may comprise a summary or a rewriting of the conversation history.

In step 204, the instructions of chunking module 302 may cause VDOC model 300 to divide the input document into a plurality of segments ($P_1 \ldots P_n$). In one embodiment, the instructions of chunking module 302 may cause VDOC model 300 to divide the input document into a plurality of segments ($P_1 \ldots P_n$) using a sliding window, wherein the text is divided into fixed-size chunks based on character count, and wherein the sliding windows may be overlapping. In another embodiment, the instructions of chunking module 302 may cause VDOC model 300 to divide the input document into a plurality of segments ($P_1 \ldots P_n$) using semantic chunking, which aims to extract text segments based on assessing the semantic relationship between these chunks and keep together chunks that are semantically similar.

In step 206, the instructions of ranking module 304 may cause VDOC model 300 to apply a language model to assign a relevance score to each of the plurality of segments ($P_1 \ldots P_n$) created in step 204.

In some embodiments, the instructions of ranking module 304 may cause VDOC model 300 to apply a language model to each segment created in step 204, with the instruction to generate a conversation (response) between a user and an agent based on the input segment. The instructions of ranking module 304 may then cause VDOC model 300 to compute the cross-entropy loss for each of the generated responses, and assign a relevance score defined as by (−1)*loss to each of the segments based on the computed loss. The instructions of ranking module 304 may then cause VDOC model 300 to rank the segments based on the assigned relevance score by ascending order.

In one embodiment, the language model is an encoder-based language model, and the loss is computed based, at least in part, on a similarity of the representation of each response generated by the language model to the representation of the input user query.

In another embodiment, the language model is an encoder-decoder or decoder-only based language model, and the loss is computed based, at least in part, on the inverse of perplexity of the representation of each response generated by the language model to the representation of the input user query.

In step 208, the instructions of generator module 306 may cause VDOC model 300 to select the top-k segments as ranked in step 206, and to stitch the top-k segments into a virtual document (VDOC). In some embodiments, the instructions of generator module 306 may cause VDOC model 300 to select the top-k segments as ranked in step 206, and to stitch the top-k segments into a VDOC which is configured to fall within the token limit imposed by the context window of the specified LLM.

In step 210, the VDOC generated in step 208 is given as input to the specified LLM, to generate a response that is grounded in the main point of the input VDOC.

As noted above, in the case of a multi-turn conversation task, steps 202-210 may iterate two or more times, wherein in each iteration, the input query may comprise a concatenation of all or part of the history of the conversation (e.g., all of part of both the user turns and the system answers) from one or more of the previous iterations. For example, in some embodiments, the input query may comprise only a first or last n turns of the conversation, only the first user query and the last n turns (skipping the turns in between), or any other similar strategy. In some embodiments, the input query may comprise a summary or a rewriting of the conversation history.

Experimental Results

The present inventors conducted experiments to evaluate the present method. The experiments were conducted using annotated "gold standard" datasets comprising user queries, content-grounded generative answers (which contain answers to the user queries), and associated long-form documents. The datasets were obtained from six different sources in the customer-support domain. The six datasets comprise a total of 34,632 training examples, and 2,631 test examples. The breakdown of the six datasets to training and test examples is presented in Table 1 below.

The input datasets were generated, at least in part, using synthetic data generation method. The synthetic data was generated using a trained language model which may be prompted with content-example pairs followed by a new content from without an associated response, following the method suggested by Yehudai et al. (2024). Genie: Achieving human parity in content-grounded datasets generation. arXiv:2401.14367v1 [cs.CL] 25 Jan. 2024.

TABLE 1

Datasets and synthetic question-answer pair distribution

| Dataset | Train (Test) | Dataset | Train (Test) |
|---|---|---|---|
| JPMC | 1874 (490) | Samsung | 830 (225) |
| Wells Fargo | 1602 (416) | Verizon | 7404 (500) |
| IBM | 9739 (500) | IBM_Cloud | 13183 (500) |

Ranking-Model Evaluation

The inventors conducted an evaluation of various language models for the task detailed with reference to step 206 of method 200 above, of ranking the plurality of segments ($P_1 \ldots P_n$) created in step 204.

The ranking model evaluations were performed over a "gold standard" annotated dataset comprising user queries, content-grounded text passages (which contain the answers to the user queries), and long-form documents.

The ranking task is defined as follows. Given a context-window size, a query, and a long-form document, create a virtual document (VDOC) that fits into the context-window size of a specified LLM and includes the content-grounded text passages. To evaluate different rankers, the context window size was fixed to 1,024 tokens (to challenge the ranker), and segment-size to 512 tokens. The segmentation method used was semantic segmentation (as described with reference to step 204 of method 200 above), and the segments were sorted by the score assigned to each segment by the ranking process. In various iterations of this experiment, different context window sizes were used, e.g., 1K, 2K, 3K, etc.

The top-k segments which fit into the context-window size of the specified LLM were selected and concatenated by their original order in the document, to form the VDOC Table 2 below compares the results of the different models which were evaluated for the ranking task, as defined above. Successful ranking was defined as including at least 90% of the "gold" passages in the resulting VDOC. As can be seen in the results shown in Table 2, small models (flan-t5-small and MiniLM-L6) achieve similar results, around 80% success rate. Larger models (bge-base-en-v1.5, flan-t5-large and MiniLM-L12-v2) achieve similar results of around 83%. The best performing model is flan-t5-large-ft which is a flan-t5-large that was fine-tuned for the task of generating the query, given the passage. It achieved 88% success for the task.

TABLE 2

Comparing rankers for the task of including the gold document in the VDOC.

| Model | VDOC activations | VDOC failures | Success |
|---|---|---|---|
| (lr)1-4 flan-t5-small | 2225 | 447 | 79.91% |
| MiniLM-L6-v2 | 2199 | 435 | 80.22% |
| MiniLM-L12-v2 | 2199 | 385 | 82.49% |
| bge-base-en-v1.5 | 2199 | 358 | 83.72% |
| flan-t5-large | 2231 | 359 | 83.91% |
| flan-t5-large-ft | 2231 | 267 | 88.03% |

End-To-End Evaluation

The inventors then analyze the contribution of VDOC to the downstream task of answer generation over a given long-form document.

In this experiment, the ranking model used was the flan-t5-large-ft, as it performed best for the content-filtering task, as detailed hereinabove. Other parameters were varied, including context-window size, chunking methods (semantic vs. sliding window), and ordering of the top-k segments in the virtual document (by original document order vs. rank order).

The Llama-13b-chat was used as the generation model with its recommended prompt (see, https://huggingface.co/blog/llama2#how-to-prompt-llama-2). Llama has a context-window size of 4 k, wherein the experiment used window sizes of 1,024, 2,048 and 3,072 (leaving some extra space for the instructions and the generated response).

The different configurations were compared by token-level recall between the generated response and the "gold" response, which measures the correctness of the generated response. As can be seen, the best results were achieved for the smaller window size of 1,024. For example, for the semantic chunking, it achieved a recall of 0.67, which is significantly better (p-value $<0.05$) compared with a recall of 0.65 and 0.63 for the other window sizes, respectively.

TABLE 3

Comparing VDOC configurations (chunking methods, window size and stitching order of segments).

| Chunking | Window | Recall doc | Recall rank |
|---|---|---|---|
| Semantic | 1024 | 0.67 | 0.67 |
| | 2048 | 0.65 | 0.65 |
| | 3072 | 0.63 | 0.63 |
| Sliding-Window | 1024 | 0.65 | 0.65 |
| | 2048 | 0.65 | 0.64 |
| | 3072 | 0.63 | 0.63 |

Of the total of 2,631 test examples, the VDOC was activated more times in the smaller window (2,231 cases, compared to only 1,632 and 1,130 cases for 2,048 and 3,072 window sizes, respectively). However, the performance on the smaller window outperformed the larger windows.

Another observation is that using semantic chunking is significantly better (p-value <0.05) than using sliding-window. For example, semantic chunking with a window of 1,024 tokens achieved a recall of 0.67, compared to a recall of 0.65 for a similar configuration but with a sliding window. Finally, the ordering of the top-k passages does not seem to have any significant advantage between doc order or rank order.

Next, the present VDOC method was compared to the method presented in Wang (2023) (see, Zhiruo Wang, et al. 2023. Learning to filter context for retrieval-augmented generation). Wang (2023) is limited to short documents, and therefore only test examples where the document is shorter than 1,024 tokens were considered.

The window size used was 512 tokens, using segment-size=128. Llama-13b-chat was sued to generate the responses. Results are shown in Table 4 below. As can be seen, the present VDOC method outperforms Wang (2023), and is quite close to the recall when using the full 1,024 document. Furthermore, K-Prec was used as a metric for hallucination, to measure the precision of tokens in the generated response, compared to the given document. As can be seen, the K-Prec of Wang (2023) is quite low, and this is mainly attributed to the fact that the filtered content is too short.

TABLE 4

Comparing VDOC to Wang (2023) on a subset of the test data with documents shorter than 1,024 tokens, using semantic segmentation with context window = 512 and segment length = 128

| Method | Recall | K-Prec |
|---|---|---|
| Wang (2023) | 0.52 | 0.21 |
| Full Document | 0.67 | 0.65 |
| Present Method (VDOC) | 0.62 | 0.48 |

Training a Generation Model with VDOC

The present inventors further analyzed the hypothesis that using the present VDOC method to truncate long documents during training is better than training with a clean gold passage, because data distribution during training will be more similar to the distribution during inference.

For this purpose, a flan-t5-xxl model was Lora fine-trained for the task of content-grounded generation in two setups. In the first, the gold passage was used as the content, along with a question and answer. In the second, a context-window of size 1,024 was assumed, and the present VDOC method was applied to long-form documents, to fit it into the window size.

The gold passage was used in cases where the VDOC failed to include it. The model was trained on 34,626 examples. Training with the present VDOC model yielded a recall of 0.73 on the 2,631 test examples, compared to 0.72 when training with the gold passage. Despite the low absolute value, the difference is significant (p-value <0.05). This is expected, as the training data is more similar to the inference data.

Evaluating Window Size

The present inventors evaluated various window sizes, to verify the finding that a smaller window yields better generation results. The gold passage was sued as a pivot, and the content was expanded around it up to a given window size, counted in tokens. The expanding was performed using full sentences, split from the content with the NLTK tool.

Two baselines were used: an upper-bound, in which only the gold passage is provided, and a lower-bound, in which no content at all is provided.

The three methods achieve similar results. Table 5 below reports results from expanding the window in both sides of the gold passage. The experiments were run with two generative LLM: Llama-13b-chat and flan-t5-xxl. As seen, both models achieve better recall on the smaller window size (1,024). Interestingly, although flan-t5-xxl achieved much higher results when provided just with the gold passage, Llama performed equally with the gold passage only and with a small window size of 1024 tokens.

TABLE 5

Comparing performances of two models along various prompt lengths.

| Window | Rec (t5-xxl) | Rec (Llama) |
|---|---|---|
| gold | 0.57 | 0.78 |
| 1024 | 0.47 | 0.77 |
| 2048 | 0.47 | 0.73 |
| 3072 | 0.46 | 0.69 |
| None | 0.3 | 0.43 |

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, +20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

receiving, as input, a user query and a source document intended for a content-grounded question-answering or multi-turn conversation task by a specified large language model (LLM) which has a context window size limit, wherein said source document has a size which exceeds said context window size limit;

dividing said source document into a plurality of segments;

generating a prompt instructing a second language model, different from the specified LLM, to generate a per-segment response for each of said plurality of segments, wherein said prompt:

(i) frames a task in which said second language model generates a conversation between a user and an agent based on the content of the respective segment, and (ii) specifies that said per-segment response is to be generated based on the content of the respective segment;

applying said second language model to each of said segments in accordance with said prompt, to generate a respective per-segment response for each of said segments;

assigning, by said second language model, to each of said segments a relevance score based on a computed similarity between said per-segment response generated for said segment and said user query;

selecting the k-top segments having the highest said relevance scores;

combining said selected k-top segments into a virtual document having a size which complies with said context window size limit; and feeding said virtual document as input to the specified LLM, to generate a response that is grounded in the content of said virtual document.

2. The computer-implemented method of claim 1, wherein said steps of receiving, dividing, receiving, applying, assigning, selecting, combining, and feeding are iterated two or more times, and wherein, in each current one of said iterations, a current said user query comprises said queries and responses from at least one previous said iteration.

3. The computer-implemented method of claim 1, wherein said dividing is performed using a sliding window operation or using semantic chunking.

4. The computer-implemented method of claim 1, wherein said relevance score is a cross-entropy loss for each of said generated per-segment responses.

5. The computer-implemented method of claim 4, wherein: said second language model is an encoder-based language model, and wherein said loss is computed based, at least in part, on a similarity of the representation of each of said generated per-segment responses to the representation of said user query; or said second language model is an encoder-decoder or decoder-only language model, and wherein said loss is computed based, at least in part, on an inverse of perplexity of the representation of each of said generated per-segment responses to the representation of the said user query.

6. The computer-implemented method of claim 1, wherein said task comprises one of:

(i) end-to-end inference based on said user query and single said source document;

(ii) end-to-end training based on said user query, a single said source document, and a gold response; or (iii) a plurality of instances of in-context learning, each comprising a said user query, a said source document, and a gold response, and using only a portion of said context window.

7. The computer-implemented method of claim 1, wherein said user query comprises a concatenation of all or part of both the user turns and system responses from at least one prior iteration of said multi-turn conversation task.

8. A system comprising:
(a) at least one hardware processor; and
(b) a non-transitory computer-readable storage medium having program code embodied therewith, the program code executable by said at least one hardware processor to:
receive, as input, a user query and a source document intended for a content-grounded question-answering or multi-turn conversation task by a specified large language model (LLM) which has a context window size limit, wherein said source document has a size which exceeds said context window size limit;
divide said source document into a plurality of segments;
generate a prompt instructing a second language model, different from the specified LLM, to generate a per-segment response for each of said plurality of segments, wherein said prompt:
(i) frames a task in which said second language model generates a conversation between a user and an agent based on the content of the respective segment, and
(ii) specifies that said per-segment response is to be generated based on the content of the respective segment;
apply said second language model to each of said segments in accordance with said prompt, to generate a respective per-segment response for each of said segments;
assign, by said second language model, to each of said segments a relevance score based on a computed similarity between said per-segment response generated for said segment and said user query;
select the k-top segments having the highest said relevance scores;
combine said selected k-top segments into a virtual document having a size which complies with said context window size limit; and
feed said virtual document as input to the specified LLM, to generate a response that is grounded in the content of said virtual document.

9. The system of claim 8, wherein said steps of receiving, dividing, receiving, applying, assigning, selecting, combining, and feeding are iterated two or more times, and wherein, in each current one of said iterations, a current said user query comprises said queries and responses from at least one previous said iteration.

10. The system of claim 8, wherein said dividing is performed using a sliding window operation or using semantic chunking.

11. The system of claim 8, wherein said relevance score is a cross-entropy loss for each of said generated per-segment responses.

12. The system of claim 11, wherein:
said second language model is an encoder-based language model, and wherein said loss is computed based, at least in part, on a similarity of the representation of each of said generated per-segment responses to the representation of said user query; or
said second language model is an encoder-decoder or decoder-only language model, and wherein said loss is computed based, at least in part, on an inverse of perplexity of the representation of each of said generated per-segment responses to the representation of the said user query.

13. The system of claim 8, wherein said task comprises one of:
(i) end-to-end inference based on said user query and single said source document;
(ii) end-to-end training based on said user query, a single said source document, and a gold response; or
(iii) a plurality of instances of in-context learning, each comprising a said user query, a said source document, and a gold response, and using only a portion of said context window.

14. The system of claim 8, wherein said user query comprises a concatenation of all or part of both the user turns and system responses from at least one prior iteration of said multi-turn conversation task.

15. A computer program product comprising a non-transitory computer-readable storage medium having program code embodied therewith, the program code executable by at least one hardware processor to:
receive, as input, a user query and a source document intended for a content-grounded question-answering or multi-turn conversation task by a specified large language model (LLM) which has a context window size limit, wherein said source document has a size which exceeds said context window size limit;
divide said source document into a plurality of segments;
generate a prompt instructing a second language model, different from the specified LLM, to generate a per-segment response for each of said plurality of segments, wherein said prompt:
(i) frames a task in which said second language model generates a conversation between a user and an agent based on the content of the respective segment, and
(ii) specifies that said per-segment response is to be generated based on the content of the respective segment;
apply said second language model to each of said segments in accordance with said prompt, to generate a respective per-segment response for each of said segments;
assign, by said second language model, to each of said segments a relevance score based on a computed similarity between said per-segment response generated for said segment and said user query;
select the k-top segments having the highest said relevance scores;
combine said selected k-top segments into a virtual document having a size which complies with said context window size limit; and
feed said virtual document as input to the specified LLM, to generate a response that is grounded in the content of said virtual document.

16. The computer program product of claim 15, wherein said steps of receiving, dividing, receiving, applying, assigning, selecting, combining, and feeding are iterated two or more times, and wherein, in each current one of said iterations, a current said user query comprises said queries and responses from at least one previous said iteration.

17. The computer program product of claim 15, wherein said dividing is performed using a sliding window operation or using semantic chunking.

18. The computer program product of claim 15, wherein:
said relevance score is across-entropy loss for each of said generated per-segment responses, and
wherein:
said second language model is an encoder-based language model, and wherein said loss is computed based, at least in part, on a similarity of the representation of each of said generated per-segment responses to the representation of said user query; or said second language model is an encoder-decoder or decoder-only language model, and wherein said loss is computed based, at least in part, on an inverse of perplexity of the representation of each of said generated per-segment responses to the representation of the said user query.

19. The computer program product of claim 15, wherein said task comprises one of:

(i) end-to-end inference based on said user query and single said source document;

(ii) end-to-end training based on said user query, a single said source document, and a gold response; or (iii) a plurality of instances of in-context learning, each comprising a said user query, a said source document, and a gold response, and using only a portion of said context window.

20. The computer program product of claim 15, wherein said user query comprises a concatenation of all or part of both the user turns and system responses from at least one prior iteration of said multi-turn conversation task.

* * * * *